(12) United States Patent
Chaubert

(10) Patent No.: US 7,212,636 B2
(45) Date of Patent: May 1, 2007

(54) ENCRYPTION OF A COMPRESSED VIDEO STREAM

(75) Inventor: Eric Chaubert, Gland (CH)

(73) Assignee: Nagravision S.A., Cheseaux-Sur-Lausanne (CH)

(*) Notice: Subject to any disclaimer, the term of this patent is extended or adjusted under 35 U.S.C. 154(b) by 925 days.

(21) Appl. No.: 10/297,431

(22) PCT Filed: Feb. 25, 2002

(86) PCT No.: PCT/IB02/00557

§ 371 (c)(1),
(2), (4) Date: Dec. 6, 2002

(87) PCT Pub. No.: WO02/069638

PCT Pub. Date: Sep. 6, 2002

(65) Prior Publication Data
US 2003/0133571 A1    Jul. 17, 2003

(51) Int. Cl.
H04K 1/04      (2006.01)
H04K 1/06      (2006.01)
H04N 7/167     (2006.01)

(52) U.S. Cl. .............................. 380/218; 380/37; 380/45
(58) Field of Classification Search ................ 380/218, 380/37, 45
See application file for complete search history.

(56) References Cited

U.S. PATENT DOCUMENTS

| 5,623,549 | A  | * | 4/1997  | Ritter ........................... 380/37 |
| 5,838,791 | A  |   | 11/1998 | Torii et al. |
| 5,949,884 | A  | * | 9/1999  | Adams et al. ................. 380/29 |
| 6,185,679 | B1 | * | 2/2001  | Coppersmith et al. ....... 713/150 |
| 6,314,186 | B1 | * | 11/2001 | Lee et al. ...................... 380/28 |
| 6,490,353 | B1 | * | 12/2002 | Tan ............................... 380/37 |
| 6,950,517 | B2 | * | 9/2005  | Hawkes et al. ............... 380/37 |
| 2004/0039908 | A1 | * | 2/2004 | Rose et al. ................... 713/168 |

FOREIGN PATENT DOCUMENTS

EP    0 984 630    3/2000

* cited by examiner

Primary Examiner—Kambiz Zand
Assistant Examiner—William Powers
(74) Attorney, Agent, or Firm—DLA Piper US LLP

(57) ABSTRACT

A method for encrypting a compressed video stream comprising independent data blocks and differential data blocks includes the steps of encrypting the independent data blocks with a different level of encryption than that used for the differential data blocks. In one embodiment, the differential data blocks are unencrypted. The method allows the reception of a compressed data stream using powerful algorithms on terminals having small cryptographic capacities.

18 Claims, 1 Drawing Sheet

| (I 1)k1 | (P/B 1-2)k2 | (I 2)k1 | (P/B 2-3)k2 | (I 3)k1 |

| I 1 | P/B 1-2 | I 2 | P/B 2-3 | I 3 |

Fig 1.

| (I 1)k1 | (P/B 1-2)k2 | (I 2)k1 | (P/B 2-3)k2 | (I 3)k1 |

Fig 2.

| (I 1)k1 | (I 2)k1 | (I 3)k1 | (P/B 1-2)k2 | (P/B 2-3)k2 |

Fig 3.

ENCRYPTION OF A COMPRESSED VIDEO STREAM

BACKGROUND OF THE INVENTION

Field of the Invention

The present invention concerns a method for encrypting a compressed video stream, particularly allowing to reinforce the level of security and at the same time not penalising the resources during the decryption.

Video compression algorithms are based on the fact that generally the differences between an image and the following one are small, and that the expression of the differences represents a quantity of information much smaller than the whole image. It has been observed that from one image to the other a great amount of information does not change and even is found in a slightly different plane. This principle is applied in the formats of the MPEG-2, MPEG-3, or Quick Time type.

According to these algorithms, a first image, called of reference, is transmitted completely and an analysis of the following images is carried out in order to determine and transmit the differences. According to the MPEG standard we distinguish the frames transmitted integrally (I-Frame) and the differential data of the MV (movement vector) type and of the DFD (difference between the MV model and the real image) type.

According to the known solutions, these data are then encrypted according to an algorithm adapted to the desired level of security. In order to maintain a compatibility during the transmission and the processing, each group is encrypted by itself, that is, that the attribution of the frames remains visible, only the content is encrypted.

With the evolution of storage means it is common to transmit encrypted data, representing for example a film, towards the unit of a user.

Once the file is stored in the user, unit, a third party can have all the necessary time to try to decrypt the data.

In order to avoid this risk, a first approach consists in increasing the level of security on the file, that is, to use powerful algorithms with long keys.

Although this technique is satisfying on the level of security, it presents the inconvenience of requiring important resources on the decryption unit.

The diversification of viewing means progress towards the use of data by units having limited cryptographic capacities. This is the case, for example, of the new mobile telephones that have a view screen. For this type of unit, the use of sophisticated algorithms in real time is not possible without degrading the performance of the unit.

Thus, the use of blocks of data encrypted by powerful algorithms is not incompatible with all types of user units.

SUMMARY OF THE INVENTION

The objective of the present application is to enable the use of powerful algorithms with terminals that have limited cryptographic capacities.

This objective is achieved by an encryption method for a compressed video stream, comprising independent data blocks and differential data blocks, comprising encrypting the independent data blocks and the differential data blocks according to different levels of encryption.

"Independent data block" means information allowing one to obtain the decompressed signal without reference to the previous information. It can be, for example, complete frames (I-Frames).

"Differential data block" means information allowing one to obtain the decompressed signal by modification of the previous signal by applying this differential information.

In fact, this solution allows the concentration of the maximum security on the information indispensable for the decompression of the images. According to this method, a first algorithm is applied on the complete (I-Frame) of the compressed video signal, and a second algorithm is applied to the differential information of the MV type or of the DFD type.

This difference can also be accomplished by the use of keys of a different length according to the type of data. Thus, the complete frames will be encrypted by a key of 2048 bits, while the differential information will be encrypted by a key of 128 bits.

According to one embodiment of the invention, the differential information is not encrypted.

It should be noted that other sources of information that work on the differential principle can also use this method. This is the case for example of the compressed music according to the MP3 format.

BRIEF DESCRIPTION OF THE DRAWINGS

The present invention will be better understood with the aid of the annexed figures, taken as non-limiting, in which:

FIG. 1 illustrates a compressed stream before the encryption operation,

FIG. 2 represents the compressed stream in encrypted form, and

FIG. 3 represents a compressed stream during its transmission.

DETAILED DESCRIPTION OF THE INVENTION

In FIG. 1, the compressed stream is represented by a series of frames of the complete, or independent, type (I) and of differential information (P/B). According to this example, a first complete frame 11, is followed by frames (P/B) 1–2 allowing for the rebuilding of the successive frames between the complete frame 11 and the next complete frame 12.

In the same way, the complete frame 12 is followed by successive differential frames P/B 2–3 allowing for the rebuilding of the complete frame 13.

This stream is then selectively encrypted according to the type of frame illustrated in FIG. 2. In this Figure, a first key k1 of a length of 2048 bits has been used to encrypt the complete frames 11, 12, and 13. A second key k2, for example of 128 bits, has been used for the encryption of the differential frames P/B 1–2 and P/B 2–3.

The length of the keys k1 and k2 is given here as an example and could be of any other length.

According to the invention, the difference of quality of the encryption can be done at the level of the keys or at the level of the algorithm used. Thus, the encryption according to k1 represents for example an algorithm of the IDEA type, and the encryption according to k2 represents an algorithm of the DES type.

During the transmission of this stream, the complete frames are sent at first as illustrated by FIG. 3. This allows the receiving unit to immediately begin the decryption of the frames that need a long processing time. Once these frames have been decrypted, the processing of the differential frames can be done in real time due to the quick execution of the type of algorithm chosen for these frames.

According to an embodiment of the invention, the level of encryption for the complete frames is different depending on if it is a first frame, such as the frame 11, or the following frames (12 and 13). In fact, to benefit from the decrypted and decompressed signal, we have to immediately process the first frame and then the frames of differences. This is why the first frame of a series is encrypted with a faster decryption algorithm than the following complete frames. This algorithm can be the same than the one for the differential frames or another algorithm.

The invention claimed is:

1. A method for encrypting a compressed video stream comprising independent data blocks and differential data blocks, the method comprising the steps of:
    encrypting at least a portion of the independent data blocks using a first algorithm, wherein the independent data blocks contain data for independent frames that can be reproduced without reference to other frames in the compressed video stream;
    encrypting the differential data blocks using a second algorithm, the second algorithm being different from the first algorithm, wherein the differential data blocks contain data for differential frames that contain differential information relative to other frames in the compressed video stream; and
    outputting the encrypted independent data blocks and differential data blocks;
    wherein the first algorithm is independent of the second algorithm.

2. The method of claim 1, wherein the first algorithm has a higher security level than the second algorithm.

3. The method of claim 1, wherein the second algorithm is faster than the first algorithm.

4. The method according to claim 1, wherein the portion of independent data blocks is encrypted by at least one key of a first length, while the differential data blocks are encrypted by at least one key of a second length, the second length being shorter than the first length.

5. The method of claim 1, further comprising the step of grouping the independent data blocks in a series; wherein the first independent block of the series is encrypted using a different level of encryption than that used to encrypt subsequent independent blocks in the series.

6. The method of claim 5, wherein the first independent data block is encrypted using an algorithm different from the first algorithm.

7. The method of claim 5, wherein the first independent data block is encrypted by a key having a length different from a length of a key used to encrypt subsequent blocks in the series.

8. A method for distributing a compressed video stream including independent data blocks and differential data blocks, the method comprising the steps of:
    encrypting the independent data blocks, wherein the independent data blocks contain data for independent frames that can be reproduced without reference to other frames in the compressed video stream; and
    transmitting the encrypted independent data blocks together with unencrypted differential data blocks, wherein the differential data blocks contain data for differential frames that contain differential information relative to other frames in the compressed video stream.

9. The method of claim 8, further comprising the step of: grouping the independent data block in a series;
    wherein a first level of encryption is used on a first independent data block in the series, and a second level of encryption is used on subsequent independent data blocks in the series, the first level of encryption being different from the second level of encryption.

10. A method for distributing a compressed video stream comprising a first independent data block, a plurality of subsequent independent data blocks, and a plurality of differential data blocks, the method comprising the steps of:
    encrypting the subsequent independent data blocks using a level of encryption different from a level of encryption used for differential data blocks; and
    transmitting the first independent data block, the subsequent independent data blocks, and the differential data blocks;
    wherein the first independent data block and the subsequent independent data blocks contain data for independent frames that can be reproduced without reference to other frames in the compressed video stream, wherein the differential data blocks contain data for differential frames that contain differential information relative to other frames in the compressed video stream, and wherein the subsequent independent data blocks are encrypted independently of any encryption of the differential data blocks.

11. The method of claim 10, wherein the differential data blocks are unencrypted.

12. The method of claim 10, further comprising the step of encrypting the first independent data block.

13. The method of claim 12, wherein the first independent data block is encrypted using a level of encryption different from the level of encryption used to encrypt the subsequent independent data blocks.

14. The method of claim 13, wherein the level of encryption used to encrypt the first independent data block is different from a level of encryption used to encrypt the differential data blocks.

15. The method of claim 13, wherein the level of encryption used to encrypt the first independent data block is the same as a level of encryption used to encrypt the differential data blocks.

16. A method for decrypting an encrypted compressed video stream comprising independent data blocks and differential data blocks, the method comprising the steps of:
    decrypting at least a portion of the independent data blocks using a first algorithm, wherein the independent data blocks contain data for independent frames that can be reproduced without reference to other frames in the compressed video stream; and
    decrypting the differential data blocks using a second algorithm, the second algorithm being different from the first algorithm, wherein the differential data blocks contain data for differential frames that contain differential information relative to other frames in the compressed video stream;
    wherein the first algorithm is independent of the second algorithm.

17. A method for processing an encrypted compressed video stream including encrypted independent data blocks and unencrypted differential data blocks, the method comprising the steps of:

receiving the encrypted independent data blocks and the unencrypted differential data blocks;

decrypting the independent data blocks, wherein the independent data blocks contain data for independent frames that can be reproduced without reference to other frames in the compressed video stream; and using the decrypted independent data blocks together with the unencrypted differential data blocks to display the video stream.

18. A method for processing a compressed video stream comprising a first independent data block, a plurality of subsequent independent data blocks, and a plurality of differential data blocks, the method comprising the steps of:

receiving the first independent data block, the subsequent independent data blocks, and the differential data blocks; and decrypting the subsequent independent data blocks using a level of decryption different from a level of decryption used for differential data blocks;

wherein the first independent data block and the subsequent independent data blocks contain data for independent frames that can be reproduced without reference to other frames in the compressed video stream, wherein the differential data blocks contain data for differential frames that contain differential information relative to other frames in the compressed video stream, and wherein the subsequent independent data blocks are decrypted independently of any encryption of the differential data blocks.

* * * * *